(12) United States Patent
Picco et al.

(10) Patent No.: US 8,485,473 B2
(45) Date of Patent: Jul. 16, 2013

(54) METHOD AND DEVICE FOR DETECTING RIME AND/OR RIME CONDITIONS ON A FLYING AIRCRAFT

(75) Inventors: Nicolas Picco, Plaisir (FR); Bruno Thillays, Plaisir (FR); Philippe Portier, Plaisir (FR); Francois Larue, Neauphle le Chateau (FR)

(73) Assignee: Intertechnique (FR)

(*) Notice: Subject to any disclaimer, the term of this patent is extended or adjusted under 35 U.S.C. 154(b) by 905 days.

(21) Appl. No.: 12/594,822

(22) PCT Filed: Apr. 9, 2008

(86) PCT No.: PCT/FR2008/050626
§ 371 (c)(1),
(2), (4) Date: Oct. 6, 2009

(87) PCT Pub. No.: WO2008/139117
PCT Pub. Date: Nov. 20, 2008

(65) Prior Publication Data
US 2010/0116940 A1    May 13, 2010

(30) Foreign Application Priority Data
Apr. 11, 2007 (FR) .................................... 07 02628

(51) Int. Cl.
*B64D 15/20* (2006.01)
(52) U.S. Cl.
USPC ................ 244/134 F; 244/134 R; 244/134 D; 73/170.26
(58) Field of Classification Search
USPC ............ 244/134 R, 134 D, 134 F; 73/170.26, 73/170.02, 170.12
See application file for complete search history.

(56) References Cited

U.S. PATENT DOCUMENTS

| 3,276,254 A | * | 10/1966 | Richard ..................... 73/170.26 |
| 3,594,775 A | | 7/1971 | Fox |
| 4,222,044 A | * | 9/1980 | Boschung ................. 244/134 R |
| 4,575,705 A | * | 3/1986 | Gotcher .......................... 338/28 |
| 4,819,480 A | * | 4/1989 | Sabin .......................... 73/170.26 |
| 4,980,673 A | | 12/1990 | Kleven |
| 5,299,867 A | * | 4/1994 | Buck ................................ 374/20 |
| 5,365,784 A | * | 11/1994 | Morrissey ................. 73/335.02 |
| 5,460,450 A | * | 10/1995 | Buck ................................ 374/20 |

(Continued)

FOREIGN PATENT DOCUMENTS
WO    WO8809980    12/1988

*Primary Examiner* — Tien Dinh
*Assistant Examiner* — Steven Hawk
(74) *Attorney, Agent, or Firm* — Dean W. Russell; Kilpatrick Townsend & Stockton LLP

(57) ABSTRACT

According to the invention, the method comprises exposing a surface (3) sensitive to relative wind and monitoring the thermal flow variations between the surface (3) and the aerodynamic flow, said variations resulting from that of the forced-convection thermal exchange coefficient between the surface (3) and the aerodynamic flow depending on the rime or ice build-up, using the temperature sensor (12) under the surface (3), considering that stripping occurs by the flow of an ice layer formed on the surface (3) if it is detected, preferably after heating by at least one heater (4), that there is a brisk rise of the flow at a temperature close to 0° C., and supplying after the detection of ice stripping, a signal indicating the presence of rime or rime conditions. A cooler (5) may cool the surface (3) for anticipating the formation of ice with a heating process. The invention can be used for detecting rime and/or rime conditions on a flying aircraft.

12 Claims, 2 Drawing Sheets

U.S. PATENT DOCUMENTS

Figure 1:
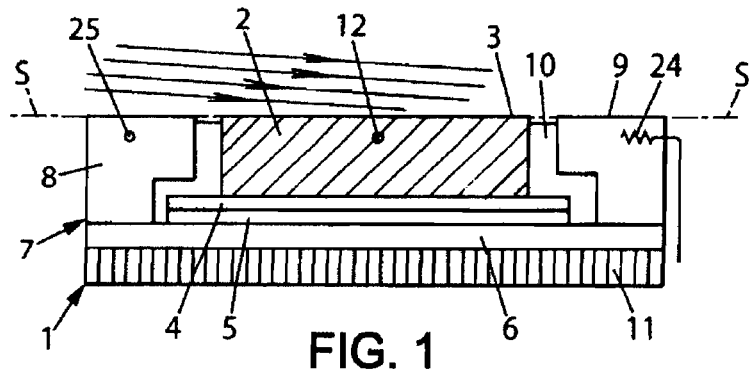

| | | | |
|---|---|---|---|
| 5,521,584 A * | 5/1996 | Ortolano et al. | 244/134 F |
| 5,614,671 A * | 3/1997 | Morrissey | 73/335.05 |
| 5,709,470 A | 1/1998 | Finley | |
| 5,790,026 A | 8/1998 | Lardiere et al. | |
| 7,000,871 B2 * | 2/2006 | Barre et al. | 244/134 F |
| 7,077,002 B2 * | 7/2006 | Sejrsen et al. | 73/204.26 |
| 7,421,894 B2 * | 9/2008 | Keep et al. | 73/170.19 |
| 7,629,558 B2 * | 12/2009 | Petrenko | 244/134 R |
| 2002/0005068 A1 * | 1/2002 | Libbrecht | 73/335.04 |
| 2003/0155467 A1 * | 8/2003 | Petrenko | 244/134 R |
| 2005/0103927 A1 * | 5/2005 | Barre et al. | 244/10 |
| 2005/0199067 A1 * | 9/2005 | Caps | 73/708 |
| 2007/0163339 A1 * | 7/2007 | Keep et al. | 73/170.19 |
| 2009/0007653 A1 * | 1/2009 | Keep et al. | 73/170.19 |
| 2012/0099616 A1 * | 4/2012 | Penny et al. | 374/16 |
| 2012/0266669 A1 * | 10/2012 | Sage | 73/170.26 |

* cited by examiner

METHOD AND DEVICE FOR DETECTING RIME AND/OR RIME CONDITIONS ON A FLYING AIRCRAFT

CROSS REFERENCE TO RELATED APPLICATIONS

This application is the U.S. national phase of International Application No. PCT/FR2008/050626 filed on Apr. 9, 2008, which application claims priority to French Application No. 0702628 filed on Apr. 11, 2007, the entire contents of which are incorporated herein by reference.

The present invention relates to a method and a device for detecting frost and/or frosty conditions on an aircraft in flight, on which at least one free external surface, exposed to the relative wind, on the skin of the aircraft, in particular its fuselage, or on a probe projecting from the aircraft into the aerodynamic flow around the latter, is reserved as a detection-sensitive surface, on which a build-up of frost or ice is likely to form in flight in frosty conditions.

Numerous methods and devices for detecting frost and/or frosty conditions on an aircraft in flight have already been proposed, these known methods and devices using different techniques for applying different physical phenomena, in particular thermal, notably by controlling thermal effects associated with management of heating power for the sensitive surface, aerodynamic, notably to provide cooling on the sensitive surface and/or sorting of the water droplets, that are possibly super-cooled, of different sizes present in the airflow around the aircraft, optical, or couplings or combinations in the application of these different physical phenomena.

The methods and devices based on the observation and control of thermal effects associated with management of a heating power for a sensitive surface deliver a signal indicating the presence of frost or, possibly, frosty conditions by referring, more often than not, either to a budget between the thermal energy provided and the temperature profile obtained on the sensitive surface, or an observable complete fusion level, and to the duration of this level, when the frost or ice changes state to water (solid-liquid transition) at substantially 0° C. In practice, if a build-up of frost or ice occurs on the sensitive surface, when the latter is heated, a portion of the thermal energy reaching the sensitive surface is consumed by the melting of the frost or ice (thermodynamic state transition) instead of producing a temperature rise on the sensitive surface.

The U.S. Pat. No. 4,980,673 discloses a device for detecting ice that implements such a method of detection based on controlling thermal effects, and which comprises an ice detection probe, on which a sensitive surface exposed to the ambient airflow is selectively heated by heating means controlled by an electronic control and regulation circuit, the temperature of the sensitive surface being detected by a temperature sensor linked to the electronic control and regulation circuit of the heating means and to clock means forming a chronometer and an electronic measuring circuit, the latter and the electronic control and regulation circuit being linked to a data processing unit, able to deliver a frost detection signal, and comprising electronic and computer means suitable for controlling the electronic control and regulation circuit of the heating means, and to establish conversions between time signals delivered by the clock means in relation to measurements from the temperature sensor and sensitive surface frost conditions.

This detection device measures the delay between the instants when the measured temperature of the sensitive surface reaches two threshold temperatures, one of which is below and the other above the level at a temperature of approximately 0° C. (melting point of ice on the sensitive surface), during a phase of heating the sensitive surface from an initial temperature lower than the threshold temperature below the level, to a final temperature of the heating phase, higher than the threshold temperature above the level, and at which the sensitive surface is totally defrosted and dry.

By comparing this duration, between the instants when the measured temperature reaches the abovementioned two threshold temperatures, with pre-stored durations for different frost states of the sensitive surface, this known device delivers a frost signal dependent on the measured duration, which substantially corresponds to the melting time of the frost or ice deposited on the sensitive surface. The measurement of the temperatures is used only to start and stop the chronometer, and the tracking over time is compared to predefined tabulated values, adjusted only relative to the observed heating speed.

Finally, this known device is described as making it possible to improve the tracking of the thermal exchanges, and in particular of the fraction of the latter due to the melting of the ice, by determining the contribution of the other losses (contact with the structure, variation of the air speed, etc. . . . ).

The drawbacks of this detection device, and of the method implemented, are numerous and very substantial. Firstly, the detection principle is fairly unreliable, because, if a disturbing element modifies the temperature rise time of the sensitive surface, the device interprets this modification as an indication of the presence of ice. For example, the abrupt arrival of water droplets on the sensitive surface (when the aircraft passes through a dense cloud) will increase the thermal exchanges at the level of the sensitive surface, the temperature rise of which is consequently slowed down. Furthermore, since the detection principle relies on the measurement of a time to melt the layer of ice deposited on the sensitive surface, it is therefore necessary for a good portion, even all, of the layer of ice to melt to obtain a meaningful detection. However, experience shows that a layer of ice can be torn off the sensitive surface, by the aerodynamic flow around the aircraft, as soon as a very small proportion of the layer of ice has melted, which greatly interferes with, or even completely falsifies, a measurement based on the thermal energy needed to melt the layer of ice.

Furthermore, at an ambient temperature close to 0° C., the detection principle proposed in the above-mentioned patent document cannot operate, because this ambient temperature is already greater than the lower threshold temperature used to initiate the measurement of the melting time, which does not make it possible to determine an instant of initiation of this measurement.

Finally, over and above the detection principle per se, this known detection device does not allow detection of frosty conditions, but rather only detection of frost or ice naturally deposited on the sensitive surface.

The problem on which the invention is based is to propose a method and a device, for detecting frost and/or frosty conditions, which do not present the drawbacks of the device and method of the state of the art described hereinabove, and, generally, that are better suited than the various known detection devices and methods to the various practical demands. In particular, the invention targets a method and a device that are reliable, practically insensitive to the disturbing elements that are statistically the most frequent and most important, such as passing through dense clouds, without there being a need to use tabulated values to post-process measurements taken, or to carry out a constant realignment with respect to potential thermal losses that may reflect the contribution of disturbances such as splashes of droplets, variations of the air speed and/or temperature.

To this end, the invention proposes a method of detecting frost and/or frosty conditions on an aircraft in flight, on which at least one free external surface, exposed to the relative wind, and preferably of at least one heat-conducting sensitive element of a detection device according to the invention, such as is more specifically described hereinbelow, said sensitive element of which is incorporated in the aircraft so that the external surface on the skin of the aircraft or on a probe projecting from the aircraft into the aerodynamic flow around the latter, is a detection-sensitive surface, on which a build-up of frost or ice is likely to form in flight in frosty conditions, the method according to the invention being characterized in that it comprises at least one cycle comprising at least the following steps, consisting in:

monitoring the variations of the thermal flux between said sensitive surface and said aerodynamic flow, which are caused by the variations of the forced convection thermal exchange coefficient between said sensitive surface and said aerodynamic flow according to the build-up of frost or ice, considering that said flow has caused a film of frost or ice formed on said sensitive surface to tear off if, after a time interval during which a slow or substantially zero reduction of the thermal flux is observed, an abrupt increase is detected in said thermal flux, to a temperature close to the melting point of the frost or ice (or around 0° C.), and following the detection of a tearing-off of frost or ice, delivering a signal indicating the presence of frost or frosty conditions.

The detection principle implemented by the method and device according to the invention does not therefore rely on the measurement of a delay but simply on the observation of the trend of a thermal flux, in order to find, not so much a slow trend linked to a possible melting of the ice, but to an abrupt rise in the thermal flux, analyzed in real time, and of which said abrupt rise to a temperature close to 0° C. is necessarily caused by the detection of a tearing-off of a layer of frost or ice previously formed on the sensitive surface, this detection principle working moreover even if said layer of frost or ice formed on the sensitive surface is simply torn off, without even partial melting.

However, it is advantageous for the method according to the invention to also include, preferably for each cycle, at least one step of heating said sensitive surface by placing the latter, preferably via said sensitive element, in a thermal exchange relationship with at least one heater, so as to provoke at least a partial melting of a film of frost or ice that may be formed on said sensitive surface, during at least one prior frost or ice build-up phase.

Furthermore, at least one step of heating said sensitive surface can advantageously be used to defrost the latter, in the event of a partial tearing-off of the film of frost or ice that covered it, so as to return the sensitive surface to a surface condition that is favorable to the correct execution of the next detection cycle.

Furthermore, it is advantageous for the heating step or the last of the heating steps to be followed by a final step of the cycle which is a cooling step, providing for a faster return than by natural cooling to an appropriate temperature as the initial temperature to begin the next cycle.

A frost detector/defroster for the sensitive surface is thus produced. However, also advantageously, in order to also produce a detector of frosty conditions, the method according to the invention further comprises, preferably for each cycle, a first step which is a step of overcooling said sensitive surface, relative to the natural balance temperature, by placing said sensitive surface, preferably via said sensitive element, in a thermal exchange relationship with at least one cooler, so as to favor the formation of frost or ice on said sensitive surface in near-frosty conditions. This overcooling step provides, in practice, an anticipation of the frost phenomenon. It will be understood that the detection method according to the invention is effective as soon as a layer of frost or ice has formed on the sensitive surface, even if the ambient temperature is very close to 0° C., since all that is needed is to provoke a tearing-off of this layer of frost or ice for an abrupt increase of the thermal exchange coefficient to be obtained. However, furthermore, through the overcooling of the sensitive surface when the ambient temperature conditions are too close to 0° C., the detection method according to the invention makes it possible to preserve the operating sequence that unfolds during the heating step, namely the heating of the frost or ice to 0° C., the formation of a layer of water under the ice at 0° C., then the tearing-off of the layer of ice and the temperature rise of the sensitive surface.

Obviously, a cooling step forming the final step of a cycle can be continued with an overcooling step forming the first step of the next cycle, in the case of the method of detecting frosty conditions, and it is to avoid any confusion that, hereinabove as hereinafter in the present descriptive specification, the first step or step of cooling the sensitive surface relative to the natural balance temperature is called the overcooling step, the expression "cooling step" being used to designate a cooling providing a return of the temperature to substantially the natural balance temperature.

Consequently, the method according to the invention effectively constitutes a method of detecting frost and/or frosty conditions if it comprises at least one succession of at least two cycles, at least one of which, and preferably each of which, comprises at least one overcooling step followed by at least one heating step, in turn followed by at least one step of cooling said sensitive surface, so as to anticipate the formation of frost or ice on this surface, then detect this formation by detecting its tearing-off, and regenerate said sensitive surface, and then return the latter to temperature conditions more favorable to the progress of the next cycle.

In an advantageous embodiment of the method according to the invention, the trend of the thermal flux is determined from the thermal power generated (by the heater(s) and/or cooler(s)) and from temperature measurements using at least one temperature sensor positioned under said sensitive surface, preferably in said at least one sensitive element, and by monitoring the modifications of the temperature profile of said sensitive element, as the temperature profile of said sensitive surface.

In a simple and effective manner, the modifications of said temperature profile are advantageously determined by calculating the time drift of a temperature deviation or of a temperature.

In this case, the method according to the invention advantageously comprises a substantially continuous time tracking of the trend of the temperature of said sensitive surface, and the delivery of a signal indicating a tearing-off of frost or ice previously deposited on the sensitive surface, said signal resulting from the detection of at least one break in the slope of the temperature trend curve resulting from said time tracking.

Furthermore, in order for the method according to the invention to also provide a signal indicating the severity of the frosty conditions, the method further comprises at least one measurement of the duration of a level, at substantially 0° C.

on the temperature curve, because the duration of said level is all the longer when the thickness of the film of deposited ice or frost is thick.

To the same end, the method according to the invention can additionally, or alternatively, include controlling the duration of the frost or ice build-up phase prior to any heating step, this control consisting in gradually reducing the duration of said build-up phase during successive cycles, until the disappearance of the detection signal is observed, at a detection limit corresponding to the longest duration of the build-up phase without obtaining a deposit of frost or ice on said sensitive surface, because the frosty conditions are all the more severe when this limit duration is short.

Furthermore, to determine the presence of frosty conditions, the method according to the invention advantageously uses (through an electronic regulation circuit and an electronic and computer data processing unit) reference information comprising at least measurements of the speed of the aircraft (Mach number), of total temperature and/or static temperature, supplied by the aircraft and/or another onboard device on or in the latter.

Another subject of the invention is a device for detecting frost and/or frosty conditions on an aircraft in flight, which comprises at least one external surface sensitive to the build-up of frost or ice when the aircraft is flying in frosty conditions, at least one heater with which said external surface is selectively placed in a thermal exchange relationship, and at least one temperature sensor detecting a temperature mirroring the temperature of said external surface, said at least one temperature sensor and said at least one heater being linked to respective measurement and regulation electronic circuits. These circuits are in communication with a data processing unit capable of delivering a frost detection signal. The device according to the invention is characterized in that it comprises at least one thermal exchange effect sensor, with at least one heat conducting sensitive element, preferably metallic, having a free surface, designed to be exposed to the relative wind when said exchange effect sensor is incorporated in the skin of the aircraft or in a probe, preferably with aerodynamic profile, mounted to project from the aircraft into the aerodynamic flow around the latter, so that said free surface of said sensitive element constitutes said sensitive external surface. Said at least one temperature sensor, which makes it possible to track the thermal flux over time, is positioned in said sensitive element, close to said sensitive surface, and said sensitive element is placed in thermal contact with said at least one heater and at least one cooler, by being mounted with said heater and said cooler in a heat-conducting casing, preferably metallic, and provided with a thermal drain, making it possible to dispel the heat extracted from said sensitive element through said at least one cooler. Said at least one cooler is also linked to the electronic regulation circuit, so that said data processing unit is able to deliver a signal indicating the detection of frosty conditions.

Furthermore, the device according to the invention can advantageously include at least one Peltier-effect module or thermoacoustic-effect module constituting a cooler and/or a heater, depending on the polarity of its electrical power supply and the possible reversal of this polarity.

However, of course, any heater can be formed, conventionally, by at least one electric heating element (resistor) incorporated in said casing, for heating the sensitive surface, while at least one Peltier-effect or thermoacoustic-effect module can also be incorporated in said casing and used only as a cooler, for the steps of cooling and/or overcooling the sensitive surface.

Furthermore, said casing of the device can advantageously delimit a heat-conducting band, at least partially surrounding said sensitive surface and substantially in the extension of the latter, so that said band and said sensitive surface are simultaneously exposed to the aerodynamic flow around the aircraft, said band being protected against the formation of frost or ice on it by heating by said thermal drain and/or by at least one dedicated heater, in order to facilitate the tearing-off of ice from the sensitive surface.

In order for the regulation of the heatings and/or coolings or overcoolings, as appropriate, of the sensitive element not to be disturbed by the anti-frost band of said casing, it is also advantageous for said sensitive element to be, on the one hand, thermally insulated from said casing and, on the other hand, in thermal contact with at least one heater and at least one cooler, advantageously in the form of at least one Peltier-effect or thermoacoustic-effect module, positioned as an interface between said sensitive element and said thermal drain.

Figure 2:
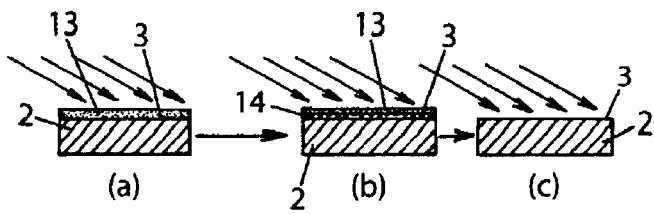
Figure 3A:
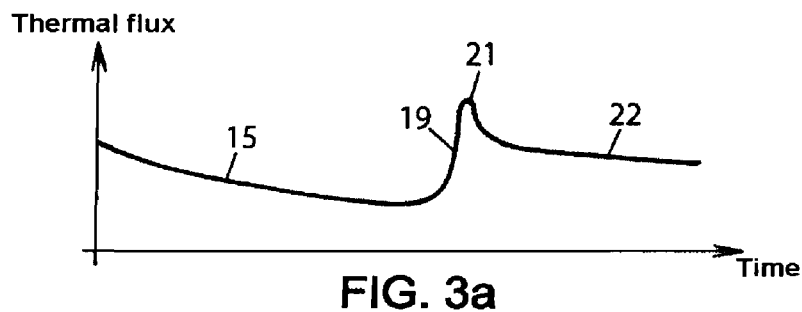
Figure 3B:
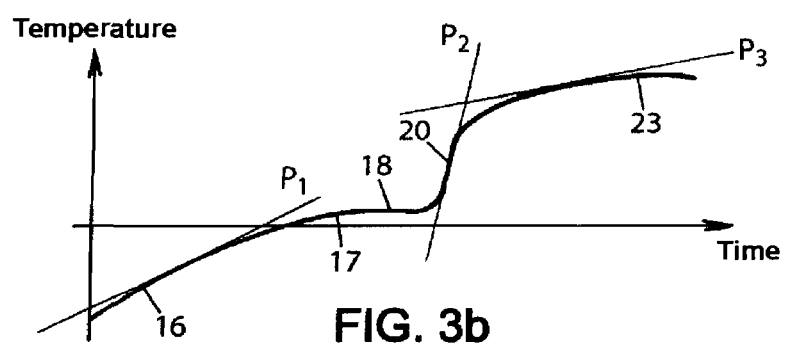
Figure 4:
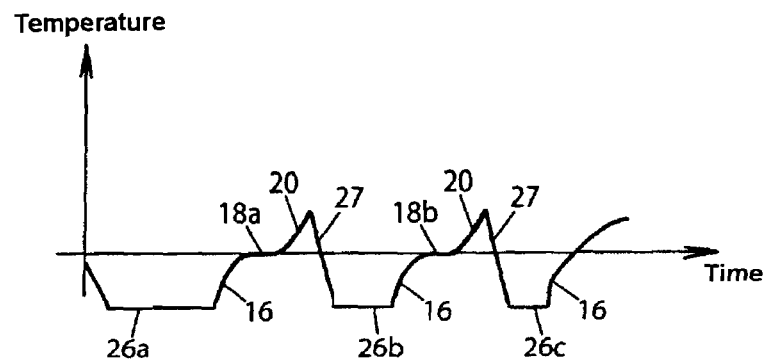
Figure 5:
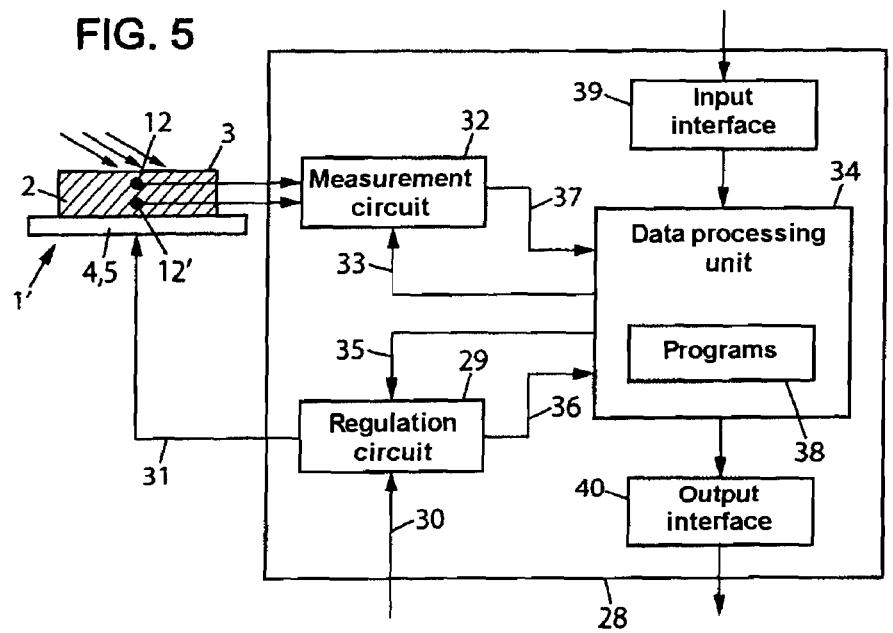

Other features and benefits of the invention will emerge from the description given hereinbelow, in a non-limiting way, of exemplary embodiments described with reference to the appended drawings in which:

FIG. 1 diagrammatically represents, in transversal cross section, a thermal exchange effect sensor of the detection device according to the invention, FIG. 2 diagrammatically represents a succession of three characteristic phases of the detection method according to the invention, FIGS. 3a and 3b are timing diagrams representing, in correlation, the respective time trend curves of the thermal flux and of the temperature at the level of the sensitive surface of the sensor of FIG. 1, FIG. 4 is a timing diagram similar to that of FIG. 3b for a succession of three detection cycles with gradual reduction of the duration of the overcooling step to gradually reduce the duration of the temperature level at substantially 0° C., to evaluate the severity of frosty conditions, and FIG. 5 is a diagrammatic representation of the detection device according to the invention with a thermal exchange effect sensor similar to that of FIG. 1.

The thermal exchange effect sensor 1 in FIG. 1 comprises a heat-conducting sensitive element 2, in this example a metallic element, the top base of which, in FIG. 1, is free and constitutes the sensitive surface 3 of the sensor 1, and the bottom base of which rests on a heater 4 and a cooler 5 mounted as an interface between the sensitive element 2 and a thermal drain 6 forming the base of a support casing 7, also heat-conducting, and preferably metallic, including a lateral part, which constitutes a band 8 surrounding, preferably completely, at least the portion of the sensitive element 2 that is adjacent to the sensitive surface 3. The sensitive surface 3 is substantially in the extension of the free external surface 9 of the band 8, and preferably slightly projecting relative to the latter, with a thermal insulation seal 10 interposed, around the lateral surfaces of the sensitive element 2, of the heater 4 and of the cooler 5, and between these and the body of the casing 7. Furthermore, a heat sink 11 can be provided under the thermal drain 6.

This way, the sensitive element 2 can be subjected to a thermal flux originating selectively from the heater 4 or from the cooler 5, when their operation is ordered by a control circuit of which one embodiment is more specifically described hereinbelow with reference to FIG. 5.

In an exemplary embodiment, the heater 4 and the cooler 5 are simultaneously produced by a module of at least one Peltier-effect element, normally operating as a cooler, and more particularly in regulated cold mode (in which case, its face directly in contact with the bottom base of the sensitive element 2 forms the actual cooler), and operating as a heater by reversal of the polarity of its electrical power supply (in which case, its face directly in contact with the base of the sensitive element 2 forms an actual heater).

When the Peltier-effect module (4-5) operates as a cooler of the base of the sensitive element 2, heat is transmitted to the thermal drain 6 via the face of the Peltier-effect module in contact with this drain 6, which transmits by conduction a portion of this quantity of heat into the conductive casing 7, and into the band 8, the external free surface 9 of which is thus heated.

However, whether the Peltier-effect module (4-5) is electrically powered to operate as a cooler or as a heater, a thermal flux is created in the sensitive element 2, between its base in contact with the Peltier-effect module (4-5) and the sensitive surface 3.

A temperature sensor 12, in the form of a thermocouple, is implanted in the sensitive element 2 at a short distance under the sensitive surface 3, and allows for a substantially continuous time tracking of the temperature at the level of the implantation of the temperature sensor 12 in the sensitive element 2, so as to give an image of the trend over time of the temperature of the sensitive surface 3.

As a variant, the heater 4 is a flat heater comprising at least one electrical heating element, preferably regulated, while the cooler 5 comprises a module with at least one Peltier-effect element used only in cold mode, which is preferably regulated.

Control of the operation of the heater 4 and of the cooler 5, both of which operate with variable thermal power, may be such that the heater 4 and the cooler 5 are not simultaneously used, but, as a variant, it is possible for the cooler 5 comprising a Peltier-effect module to be used permanently as a cooler, the heater 4, with electrical heating element, being used only intermittently by diffusing a thermal power that compensates, when necessary, the permanent operation of the Peltier-effect module as a cooler. The latter two variants have the advantages of increasing the service life of the Peltier-effect module and shortening the transition delay between the cooling and heating modes.

Also as a variant, the heater 4 and the cooler 5 can simultaneously be formed by a module with at least one thermoacoustic-effect element in place of the module with at least one Peltier-effect element.

The duly formed thermal exchange effect sensor 1 assembly can be mounted on an aircraft by being incorporated in the skin of the aircraft or, more easily, in a probe with aerodynamic profile, which is in turn mounted projecting on the aircraft, so that, in both cases, the sensitive element 2 is mounted in the casing 7 so that the sensitive surface 3 of the sensitive element 2 and the external free surface 9 of the band 8 are exposed to the aerodynamic flow, or relative wind, that is created around the aircraft, and is diagrammatically represented in FIG. 1 by airlines directed by arrows indicating the direction of the flow and possibly carrying water droplets, which may be super cooled, in particular when the aircraft passes through dense clouds in frosty conditions.

When the sensor 1 is incorporated in the skin of an aircraft or of such a probe projecting from the aircraft and such that the sensitive surface 3 and the external free surface 9, respectively of the sensitive element 2 and of the band 8, are in the extension of one another and of the external surface S of the corresponding skin of the aircraft or of said probe, this sensor 1 can be implemented in three operating modes.

The first operating mode of the sensor 1 relies on an abrupt variation of the thermal exchange coefficient by forced convection on the sensitive surface 3 of the sensitive element 2, this abrupt variation being provoked by the at least partial tearing-off of a layer of ice or frost that was previously deposited on the sensitive surface 3, when the aircraft is flying in frosty conditions. This abrupt variation of the thermal exchange coefficient induces a variation, also abrupt, in the thermal flux that is imposed in the sensitive element, and this abrupt variation in the thermal flux causes the trend over time of the temperature at the level of the temperature sensor 12 to be modified, also sharply.

Based on this first operating mode, a detection device comprising the thermal exchange effect sensor 1 can be used as a frost detector. A detection cycle in this case comprises a phase or step of the build-up of frost or ice on the sensitive surface 3, at the forced convection natural balance temperature of this surface 3 under the effect of the aerodynamic flow, then a phase or step of heating this surface 3, by starting up the heater 4 of the sensor 1, which makes it possible, or at least makes it easier, for the built-up ice or frost on the sensitive surface 3 to be torn off by the aerodynamic flow.

After this tearing-off, the heating step is preferably continued over a time interval, preferably variable and suited to the thickness of deposited ice or frost, in order to fully defrost the sensitive surface 3, and then is followed, preferably, by a cooling step, for more rapidly returning the sensitive surface 3 to temperature conditions close to the forced convection natural balance temperature, such as that, or close to that obtained before the heating phase, in order to restore temperature conditions favorable to a possible application of a next cycle.

The second operating mode of the sensor 1 relies on a cycle comprising, in succession, at least a cooling to a temperature substantially lower than the forced convection natural balance temperature, called "overcooling", of the sensitive surface 3, followed by at least one heating of this same surface 3. The overcooling of the sensitive surface 3 is obtained by overcooling the sensitive element 2, handled by the starting up of the cooler 5, such as the above-mentioned Peltier-effect module in normal polarization mode, to favor the formation of ice or frost on the sensitive surface 3 when the surrounding aerothermodynamic conditions approach frosty conditions, the occurrence of which at the level of the sensitive surface 3 is thus anticipated. Thus, as in the first operating mode described hereinabove, the heating of the sensitive element 2, obtained by starting up the heater 4, for example by reverse polarization of the above-mentioned Peltier-effect module, leads to the tearing-off of the ice formed on the sensitive surface 3 by aerodynamic effect, this tearing-off inducing the abrupt variation of the thermal exchange coefficient explained hereinabove, and leading to the abovementioned abrupt variations of the thermal flux in the sensitive element 2 and of the temperature measured by the temperature sensor 12, which may be detected by the substantially continuous tracking over time of the trend of the measured temperature.

As for the first operating mode, the second is advantageously suited to a certain extension of the heating step to ensure a complete defrosting of the sensitive surface 3, then of a cooling step, making it possible to increase the sensitivity of the sensor 1 by shortening the delay in cooling the sensitive surface 3 to the forced convection natural balance temperature, relative to a natural cooling up to this balance temperature, or to the substantially negative temperature sought at the start of a cycle, this cooling step thus more rapidly placing the sensor 1 in temperature conditions favorable to the progress of a subsequent cycle.

The third operating mode relies on the application of consecutive detection cycles, authorized by the defrosting, at the end of each cycle, of the sensitive surface 3 of the sensitive element 2 by the same effect to that which is used to detect, namely a positive thermal flux from the heater 4 to the sensitive surface 3 through the sensitive element 2, that is to say by continuing or, possibly, resuming a heating step, after the detection of a tearing-off of ice, as already explained hereinabove preferably for the first and second operating modes, preferably followed by a cooling step, prior to a step or phase of build-up of ice on the sensitive surface 3 with overcooling of the latter and of the sensitive element 2, at the start of the next cycle. These successions of detection cycles make it possible to determine at least one indication of the severity of the frosty conditions and/or of leaving the frosty conditions.

To return to the basic operation of the device according to the invention as a frost detector, after a build-up phase at the forced convection natural balance temperature, the heater 4 of the sensor 1 of FIG. 1, for example the Peltier-effect module powered in reverse polarization mode, is used to heat the sensitive surface 3, then the operation of the cooler 5 replaces that of the heater 4, for example the Peltier-effect module is powered in normal polarization mode to operate as a cooler, to assist in the cooling (without overcooling) facilitating a return to the initial temperature conditions.

In the absence of ice on the sensitive surface 3, the thermal flux created through the sensitive element 2, between the heater 4 and the sensitive surface 3, is only determined by the thermal power dissipated by the heater 4 on the side of the sensitive element 2, and the aerothermodynamic exchanges on the side of the sensitive surface 3.

These aerothermodynamic exchanges depend mainly on the characteristics of the sensitive surface 3 (its area, its roughness, the thermal conductivity of the material of the sensitive element 2, mainly on the surface 3) and on the characteristics of the airflow (its speed, density, viscosity, calorific capacity, conductivity, and its angle of incidence relative to the sensitive surface 3) possibly carrying water droplets and/or ice crystals, and the temperature deviation between these two mediums.

The trend over time of the temperature measured by the sensor 12 then follows a law according to a continually increasing function having a curved profile with concavity facing toward the x axis (time axis), the slope of which diminishes gradually with no abrupt variation.

When ice has formed on the sensitive surface 3, the thermal flux created between the heater 4 and this sensitive surface 3, through the sensitive element 2, is different because of modified aerothermodynamic exchanges, between the sensitive surface 3 and the airflow, because of the presence of the deposited ice. In practice, the presence of ice on the sensitive surface 3 prevents direct forced convection between the airflow and the sensitive element 3, and reduces the thermal flux by the reduced thermal conductivity of the ice. The result of this is a more rapid trend (increasing) in the temperature measured by the temperature sensor 12.

This heating of the sensitive surface 3 leads, because of the latent heat of fusion of the ice to water, to the formation of a film of water at substantially 0° C. between the layer of ice and the sensitive surface, which makes it possible for the ice previously built up on the sensitive surface 3 to be torn off by the airflow. This creates an abrupt transition between the thermal conditions in the presence of ice and without ice on the surface 3, and in turn an abrupt variation (increase) in the profiles of the thermal flux and temperature measured by the sensor 12, which can easily be detected so as to deduce a signal indicating the presence of frost therefrom.

The operation of the heater 4 may be stopped and that of the cooler 5 ordered (the Peltier-effect module can be switched from a reverse polarity power supply to a normal polarity power supply) to cool the sensitive surface 3, without overcooling relative to the external conditions, possibly after a certain extension of the heating step to ensure a complete defrosting of the sensitive surface 3, thereby restoring the thermal and surface—state conditions of the sensitive surface 3 for a subsequent cycle.

Regarding the second operating mode of the device according to the invention as a detector of frosty conditions, it involves, in a first operating phase or step, overcooling the sensitive surface 3, relative to the natural balance temperature in order to favor the formation of ice on this surface 3.

During this first overcooling phase, the sensitive surface 3 is therefore brought to and then maintained at a temperature less than the temperature imposed by the airflow, in order to favor the formation of ice, as diagrammatically represented by the layer of ice 13 deposited on the sensitive surface 3 of the sensitive element 2, in the first phase (a) of FIG. 2, in near-frosty conditions. This overcooling is provided by the operation of the cooler 5 (for example the Peltier-effect module normally operating in cold mode), so that all of the sensitive element 2 is brought to a marked negative temperature.

The second operating phase is a heating of the sensitive element 2 and of its sensitive surface 3, by the operation of the heater 4 and stopping of the cooler 5 (for example, by application of a reverse voltage to the Peltier-effect module), in order to create an even rise in the temperature of the sensitive surface 3.

If the sensitive surface 3 is not covered with ice, the temperature measured by the sensor 12 increases to a value slightly greater than 0° C. The conditions are then declared "non-frosty". However, if the sensitive surface 3 is covered, however partially, with ice, the trend (increase) of the temperature measured by the sensor 12, mirroring the temperature of the sensitive surface 3, undergoes a dip on approaching 0° C., followed by a level at a temperature close to 0° C. This level is provoked by the heating of the ice to 0° C. followed by the melting of a film of ice in contact with the sensitive surface 3, thus forming a film of liquid water at 0° C. between the ice and the sensitive surface 3, this layer of water leading to the rapid tearing-off of the ice through losses of adhesion under the effect of the airflow. While the ice is melting, a thermal build-up occurs in the sensitive element 2, which provokes an abrupt rise in the temperature of the surface 3 at the time of the tearing-off, however partial, of the ice previously covering this surface 3. The temperature (positive) is then rapidly stabilized because of the thermal dissipation by forced convection acting directly on the sensitive surface 3, which is in addition totally defrosted by this positive temperature.

The phase of melting of the ice into a film of water 14 between the ice 13 and the sensitive surface 3 is diagrammatically represented in the second phase (b) of this process, which ends with the phase (c) of FIG. 2, after the tearing-off of the ice and the removal of the melt water by the airflow to release a totally defrosted sensitive surface 3.

The operating mode described hereinabove is illustrated in FIGS. 3a and 3b representing, one above the other, timing diagrams of the thermal flux and of the temperature of the sensor 12 in the sensitive element 2.

On the flux curve of FIG. 3a, the zone 15 of variation of the flux with a low slope corresponds to a heating phase that follows the phase of build-up of ice on the sensitive surface 3, since, as already mentioned hereinabove, the thermal exchange coefficient between the sensitive surface 3 and the airflow is reduced all the more strongly when the ice deposit is great, because of the low thermal conductivity of the ice.

On the temperature curve of FIG. 3b, obtained from measurements from the sensor 12, the weak trend zone 15 of the thermal flux corresponds to a zone 16 of regular increase in the temperature which is essentially negative, with a slope that gradually diminishes until it is substantially cancelled out at the level of a dip 17 followed by a level 18 at substantially 0°, due to the melting of a portion of the ice, as explained hereinabove. The tearing-off of the ice by the airflow provokes, for the reasons explained hereinabove, an abrupt increase 19 in the thermal flux, at the same time as an abrupt increase 20 in the temperature measured by the sensor 12, with a very marked break of slope, followed, on the flux curve of FIG. 3a, by a dip that is abrupt but of limited amplitude after a peak 21 and finally a stabilization with an even decrease with very low slope over the zone 22, because of the direct forced convection on the sensitive surface 3, this time with a positive temperature, also with rapid stabilization with a weak and gradually decreasing positive slope, over the zone 23 of the temperature curve of FIG. 3b.

Thus, to detect the presence of ice on the sensitive surface 3, overcooled relative to the surrounding thermal conditions to anticipate this formation of ice, it is possible to detect the tearing-off of this ice by detecting an abrupt variation (increase) 19 of the thermal flux, corresponding to an abrupt increase in the thermal exchange coefficient, and to which there corresponds an abrupt increase 20 in the measured temperature and in the slope of the temperature, which experiences a very marked break at this level. Knowing the thermal power generated during the heating by the heater 4, it is therefore possible to use the relationship that exists between the slope or drift over time of the temperature and the thermal exchange coefficient to detect an abrupt variation of this coefficient indicating tearing-off of ice, or even use the abrupt temperature rise 20 at the time of the tearing-off, in conjunction with the thermal build-up effect occurring just previously and/or with the rapid stabilization effect through thermal dissipation by forced convection in the zone 23, which may, practically, be produced by comparisons between the slope P2 with high value in the zone 20 of abrupt temperature rise, at the time of the tearing-off of the layer of ice, and/or one or other of the slopes P1 and P3 respectively in the zones 16 and 23 of the temperature curve of FIG. 3b, and for which P1 is greater than P3, while being very much less than P2.

It should be noted that the comparison of the slopes P1 and P3 of the temperature curve of FIG. 3b also makes it possible to detect a variation of the thermal exchange coefficient provoked by a tearing-off of the ice.

The operation of the thermal exchange effect sensor 1, used in the device according to the invention, can be enhanced by preventing the build-up of ice around the sensitive surface 3, that is to say by providing antifrosting of the external free surface 9 of the band 8 of the casing 7.

It has already been mentioned that, while the cooler 5 is operating, the heater 4 does not operate, and the heat released on the side opposite the sensitive element 2 is conducted by the thermal drain 6 into the casing 7, as far as the band 8 and the external free surface 9 of the latter, so that the heating band 8 produced in this way protects the sensor 1 from complete frosting, making any detection impossible. In practice, the anti-frosting of the external free surface 9 of the band 8 facilitates the tearing-off of any layer of ice formed on the sensitive surface 3. In order to provide this antifrosting of the surface 9 of the band 8, including during the heating step during which the heater 4 operates (and not the cooler 5), a second heater 24 may be provided, comprising at least one electrical heating element, embedded in the band 8 at a short distance under the external free surface 9 of the latter and which constitutes a heater 24 dedicated to keeping this surface 9 defrosted, that is to say at a weakly positive temperature, in all circumstances.

Furthermore, at least one other temperature sensor 25, for example a thermocouple, can also be implanted in the band 8, at a short distance under the free surface 9 of the latter, so as to measure a temperature substantially corresponding to the temperature of the surface 9, and which makes it possible to provide a thermal regulation of the band 8, from which can be drawn information making it possible to refine the operation of the sensor 1 and its detection of frost and/or frosty conditions. Thus, the heating band 8, thermally insulated from the sensitive element 2 by the thermal insulation seal 10 in order to limit the thermal couplings between the band 8 and the sensitive element 2, has an external free surface 9 which can be defrosted by a temperature and heating regulation device, the set point of which is above 0° C. The benefit of such a regulation device is to ensure a releasing of the thermal exchange effect sensor 1, with respect to a possible layer of ice formed on the structure of the aircraft or of the probe, and which could hamper the detection.

The third operating mode consists in implementing a succession of detection cycles, such as those described hereinabove for the second operating mode, of which the overcooling, heating and cooling powers can advantageously be regulated, by taking account of the surrounding aerothermodynamic conditions, in order, not only to obtain information on the presence or absence of frosty conditions, but also on the severity of the frosty conditions.

To this end, a first severity measurement may consist, while repeating a succession of frosty condition detection cycles according to the first or second mode of operation described hereinabove with reference to FIGS. 2, 3a and 3b, in measuring the duration of the level 18 at substantially 0° C., and in following the trend over time of this duration, because the longer this level becomes, the thicker the layer of ice formed on the sensitive surface 3 becomes, and therefore the greater the severity of the frosty conditions in the environment of the aircraft in flight. This duration of the level 18 can be measured between an instant when the slope of the temperature curve passes below a weakly positive threshold, and an instant when this same slope passes through a value higher than a second slope threshold that is strongly positive, corresponding to the abrupt increase 20 in temperature. Thus, breaks in the slope can be not only detected in the vicinity of 0° C. and/or following the passage through the level 18 at 0° C., to detect the presence of ice, but also to measure the duration of the level 18 at 0° C., as an index of the severity of the frosty conditions.

Another indication concerning the severity of the frosty conditions can be drawn from the driving of the duration of the ice build-up phase on the overcooled sensitive surface 3, during successive cycles, by the reduction in the duration of the successive build-up phases (or overcooling phases) 26a, 26b and 26c of such cycles, leading to the reduction of the duration of the successive levels at 0° C. 18a and 18b, until this level at 0° C. disappears, for, for example, the third cycle represented in FIG. 4, which corresponds to the limit of detection of the presence of ice. In practice, the shorter the duration of the final build-up phase 26c, for which the corresponding level at 0° C. disappears, becomes, the more severe the frosty conditions become. In other words, this driving consists in gradually reducing the duration of the build-up phase 26a, 26b, 26c during successive cycles, until the disappearance of the detection signal is observed, at a detection limit corresponding to the longest duration of the build-up phase 26c, without obtaining any deposition of ice on the sensitive surface 3. Obviously, between two successive build-up phases such as 26a and 26b or 26b and 26c, there is a heating step, with a gradual rise in negative temperature in the zone 16, followed by a level 18a or 18b at substantially 0° C., which is in turn followed by an abrupt increase 20 in the temperature and in the temperature slope, indicating the abrupt increase in the forced convection thermal exchange coefficient on the sensitive surface 3 when the ice is torn off by aerodynamic effect, this abrupt increase 20 being in turn followed by a cooling 27, to shorten the delay to return to the initial overcooled conditions, to begin the next cycle, by using in FIG. 4 the same references as those of FIG. 3b to designate the same zones of the curves, but assigning them indexes a, b and c to identify the first, second and third consecutive cycles of such a sequence. In these detection cycles, each heating step is used both to detect the tearing off of ice and defrost the sensitive surface 3. Detection cycles strung together in succession thus make it possible to define the frost severity by observing their succession, the trend of the successive build-up delays, in particular their duration, and the trend of the level of cooling needed for ice to build up.

During successive detection cycles, the overcooling of the sensitive element 2 and of the sensitive surface 3 can be adjusted according to the external areothermodynamic conditions, so as to ensure a build-up of ice on the sensitive surface 3 when close to frosty conditions, this overcooling being followed by a heating to a temperature close to 0° C. and the observation of the slope and of the trend of the slope of the temperature curve as a function of time.

To take account of the surrounding aerothermodynamic conditions, the detection device according to the invention, one example of which is diagrammatically represented in FIG. 5, comprises not only at least one thermal exchange effect sensor 1 according to FIG. 1 or a similar sensor 1' according to FIG. 5, but also an electronic control and measurement unit 28 comprising an electronic power regulation circuit 29, electrically powered at 30 and electrically powering the heater 4 and the cooler 5 forming a thermal flux generator of the sensor 1', via the line 31, the unit 28 also comprising an electronic measurement circuit 32, handling the tracking of the thermal fluxes based on temperature measurement information that it receives from two temperature sensors (thermocouples) 12 and 12' implanted in the sensitive element 2 of the sensor 1', a short distance away from the sensitive surface 3 of this element 2, but being separate from one another by a short distance in a direction (locally) perpendicular to the sensitive surface 3, so that the temperature difference between the instantaneous measurements of the two sensors 12 and 12' is proportional to the instantaneous thermal flux in the sensitive element 2. The measurement circuit 32 receives, via the line 33, processing information that is transmitted to it by a data processing unit 34 of the unit 28. When the data processing unit 34 also transmits in 35 processing information to the regulation circuit 29 which transmits, in the reverse direction, in 36, regulation information to the unit 34, which similarly receives measurement information in 37 from the measurement circuit 32. The data processing unit 34 implements programs 38 relating to regulation and measurement information processing algorithms in particular. The unit 28 also comprises an input interface 39, which receives signals, in particular the speed of the aircraft (Mach number), total temperature and static temperature, originating from a central measurement unit of the aircraft or from equipment onboard the latter, and necessary for taking into account the external aerothermodynamic conditions for the detection of frosty conditions, the unit 28 finally including an output interface 40 delivering a frost detection or frosty conditions detection signal advantageously matched with a severity signal.

The invention claimed is:

1. A method of detecting frost and/or frosty conditions on an aircraft in flight, on which at least one free external surface, exposed to an aerodynamic flow around the aircraft, on a skin of one of the aircraft a probe projecting from the aircraft into the aerodynamic flow, is reserved as a detection-sensitive surface, on which a build-up of frost or ice is likely to be formed in flight in frosty conditions, the method including at least one cycle with at least the following steps, comprising:
   monitoring variations of a thermal flux between said sensitive surface and the aerodynamic flow, which are caused by variations of a forced convection thermal exchange coefficient between said sensitive surface and the aerodynamic flow according to a build-up of frost or ice,
   considering that the aerodynamic flow has caused a film of frost or ice formed on said sensitive surface to tear off if, after a time interval during which a slow or substantially zero reduction of said thermal flux is observed, an abrupt increase is detected in said thermal flux at a temperature close to the melting point of the frost or ice, and
   following a detection of a tearing-off of frost or ice, delivering a signal indicating the presence of frost or frosty conditions.

2. The method as claimed in claim 1, also comprising at least one step of heating said sensitive surface by placing said sensitive surface in a thermal exchange relationship with at least one heater, so as to provoke at least a partial melting of a film of frost or ice that may be formed on said sensitive surface, during at least one prior frost or ice build-up phase.

3. The method as claimed in claim 2, wherein at least one step of heating said sensitive surface is used to defrost said sensitive surface, at least following an at least partial tearing-off of said film of frost or ice that covered said sensitive surface.

4. The method as claimed in claim 2, wherein said heating step or a last one of several heating steps is followed by a final step, which is a cooling step, enabling a faster return than by natural cooling to an appropriate temperature as an initial temperature to begin a next cycle.

5. The method as claimed in claim 1, also including a first step, which is a step of overcooling said sensitive surface, relative to the natural balance temperature, by placing said sensitive surface in a thermal exchange relationship with at least one cooler, so as to favor the formation of frost or ice on said sensitive surface in near-frosty conditions.

6. The method as claimed in claim 5, including at least one succession of at least two cycles, at least one of which comprises at least one overcooling step followed by at least one heating step, followed in turn by at least one step of cooling said sensitive surface, so as to anticipate and then detect a formation of frost or ice by detecting a tearing-off of said frost or ice, and regenerate said sensitive surface and then return the said sensitive surface to temperature conditions more favorable to the progress of a next cycle.

7. The method as claimed in claim 1, wherein a trend of said thermal flux is determined from a thermal power generated to produce said thermal flux and temperature measurements using at least one temperature sensor positioned under said sensitive surface, and by monitoring modifications of a temperature profile of said sensitive surface.

8. The method as claimed in claim 7, wherein said modifications of said temperature profile are determined by calculating a time drift of a temperature deviation or a temperature.

9. The method as claimed in claim 7, comprising a substantially continuous time tracking of a trend of the temperature of said sensitive surface, and a delivery of a signal indicating a tearing-off of frost or ice, previously deposited on said sensitive surface, said signal resulting from a detection of at least one break in the slope of a temperature curve, resulting from said time tracking.

10. The method as claimed in claim 9, further comprising at least one measurement of the duration of a level at substantially 0° C. on said temperature curve, so as to obtain a signal indicating the severity of frosty conditions, because said duration of said level is all the longer when the thickness of a film of deposited ice or frost is thick.

11. The method as claimed in claim 2, further comprising controlling the duration of a frost or ice build-up phase prior to any heating step, said control consisting in gradually reducing the duration of said build-up phase during successive cycles, until disappearance of a detection signal is observed, to a detection limit corresponding to the longest duration of said build-up phase without obtaining a deposit of frost or ice on said sensitive surface, because frosty conditions are all the more severe when said limit duration is short.

12. The method as claimed in claim 1, using reference information comprising at least measurements of the speed of the aircraft, of total temperature and/or of static temperature, supplied by the aircraft and/or another onboard device on or in the aircraft.

\* \* \* \* \*